(12) United States Patent
Kargenian et al.

(10) Patent No.: US 11,052,474 B2
(45) Date of Patent: Jul. 6, 2021

(54) CABLE CUTTER

(71) Applicant: Klein Tools, Inc., Lincolnshire, IL (US)

(72) Inventors: John H. Kargenian, Lincolnshire, IL (US); Peter D. Kim, Lincolnshire, IL (US)

(73) Assignee: Klein Tools, Inc., Lincolnshire, IL (US)

( * ) Notice: Subject to any disclaimer, the term of this patent is extended or adjusted under 35 U.S.C. 154(b) by 0 days.

(21) Appl. No.: 16/554,357

(22) Filed: Aug. 28, 2019

(65) Prior Publication Data

US 2020/0078875 A1 Mar. 12, 2020

Related U.S. Application Data

(60) Provisional application No. 62/728,325, filed on Sep. 7, 2018.

(51) Int. Cl.
 *B23D 29/00* (2006.01)
 *B23D 15/12* (2006.01)
 *B23D 15/04* (2006.01)
(52) U.S. Cl.
 CPC ........... *B23D 29/002* (2013.01); *B23D 15/04* (2013.01); *B23D 15/12* (2013.01)
(58) Field of Classification Search
 CPC ....... B23D 29/002; B23D 15/04; B23D 15/12
 See application file for complete search history.

(56) References Cited

U.S. PATENT DOCUMENTS

| 4,055,891 | A | * | 11/1977 | Wick | B23D 29/023 |
| | | | | | 30/250 |
| 5,243,761 | A | * | 9/1993 | Sullivan | A62B 3/005 |
| | | | | | 173/169 |
| 10,612,163 | B2 | * | 4/2020 | Kia | D01F 8/18 |
| 2008/0000091 | A1 | * | 1/2008 | Eriguchi | B23D 35/005 |
| | | | | | 30/90.1 |
| 2011/0219626 | A1 | * | 9/2011 | Broeker | B23D 29/002 |
| | | | | | 30/92 |
| 2014/0007434 | A1 | * | 1/2014 | Westley | B23D 17/06 |
| | | | | | 30/245 |

\* cited by examiner

*Primary Examiner* — Omar Flores Sanchez
(74) *Attorney, Agent, or Firm* — Leydig, Voit & Mayer, Ltd.

(57) ABSTRACT

A cable cutter includes stationary and moveable clamps, each comprising a respective pivot opening and a cutting edge spaced from the pivot opening. A pivot joint connects the clamps to allow the movable clamp to pivot about a pivot axis relative to the stationary clamp. The pivot joint includes a threaded connector having a head and a shank extending from the head along the pivot axis through the pivot openings in the clamps. A collar has opposing faces and an opening extending through the collar. A nut is threaded on the shank and the clamps are sandwiched between the head and the collar with the head adjacent one of the clamps. The collar is engaged to rotate with the shank the about the pivot axis.

19 Claims, 7 Drawing Sheets

CABLE CUTTER

CROSS-REFERENCE TO RELATED APPLICATIONS

This patent application claims the benefit of U.S. Provisional Patent Application No. 62/728,325, filed Sep. 7, 2018, the disclosure of which is incorporated herein by reference in its entirety for all purposes.

BACKGROUND OF THE DISCLOSURE

The present disclosure relates to power tools and, more particularly, to cable cutters.

BACKGROUND OF THE DISCLOSURE

Cable cutters are known for cutting cables such as stranded metal cables, ropes, multiple stranded wire bundles and the like. One known type of a cable cutter includes a pair of clamps, each having a cutting edge. The cutting edges of the two opposing clamps face one another such that a cable to be cut is placed between the clamps. With one clamp being moveable, and the second stationary, the cable is placed between the cutting edges of the clamps, and the moveable clamp is moved towards the stationary clamp such that the two cutting edges pinch a cross section of the cable.

Motion of the moveable clamp can be carried out manually, for example, by attaching handles to the two clamps, or by the aid of a powered device, such as an actuator. Traditionally, powered cable cutters have used hydraulic or mechanical force to move the clamps. In these and other types of clamps, certain structural conditions may affect the operation of the device. For example, the cutting edges of the clamps may become dull. Also, the mechanical linkages associated with connecting the clamps and transferring power to move the moveable clamp may become worn.

DETAILED DESCRIPTION OF A PREFERRED EMBODIMENT

The present disclosure relates to cable cutters and, more specifically, to an electrically powered, hand-held cable cutter, but it should be appreciated that certain structures and features described herein are applicable to other types of cable cutters such as powered cable cutters using a different type of power, for example, hydraulic actuators, to drive the cable-cutting components.

Figure 1:
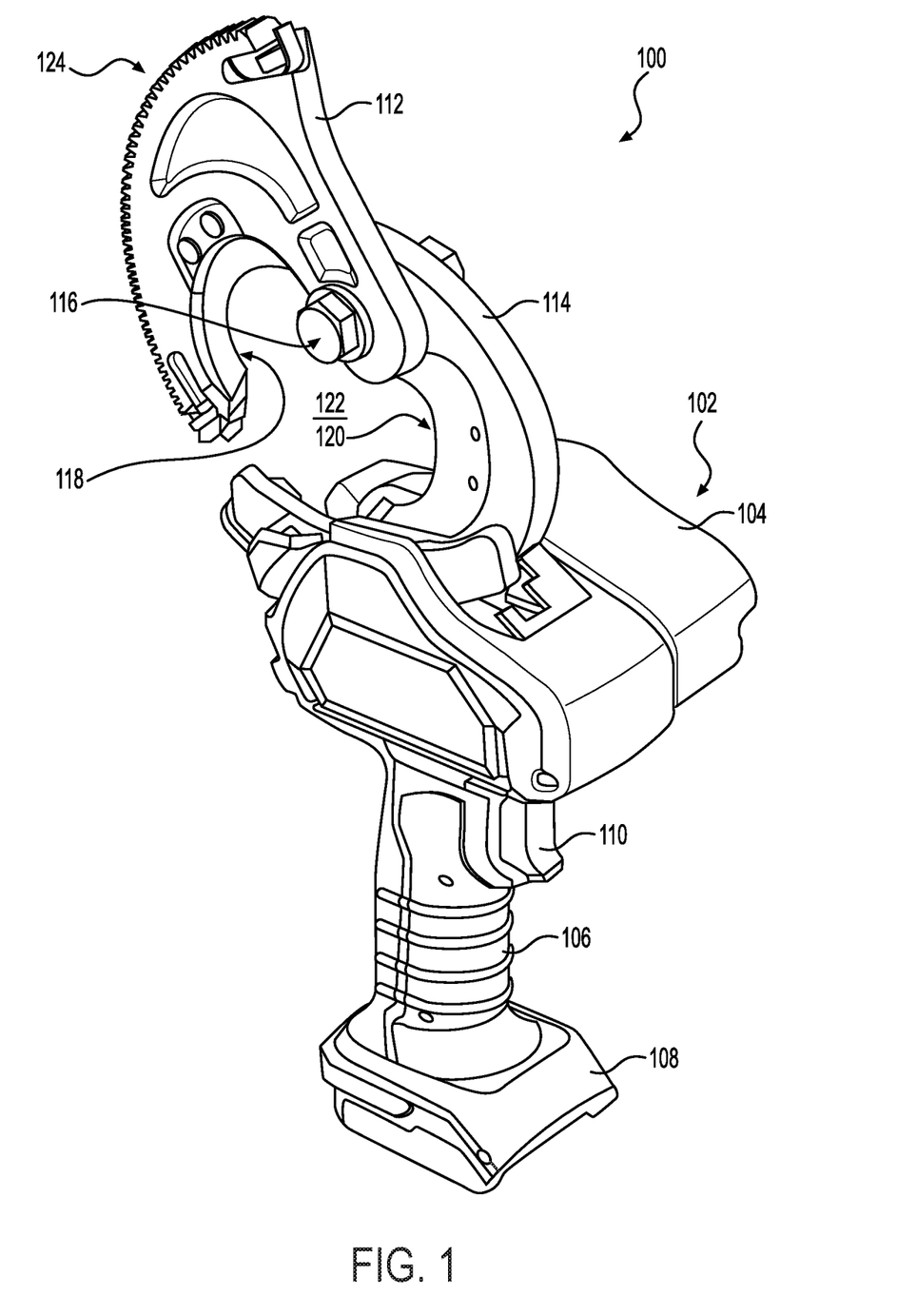
FIGS. 1 and 2 are outline views from different perspectives of a cable cutter in accordance with the disclosure.
Figure 2:
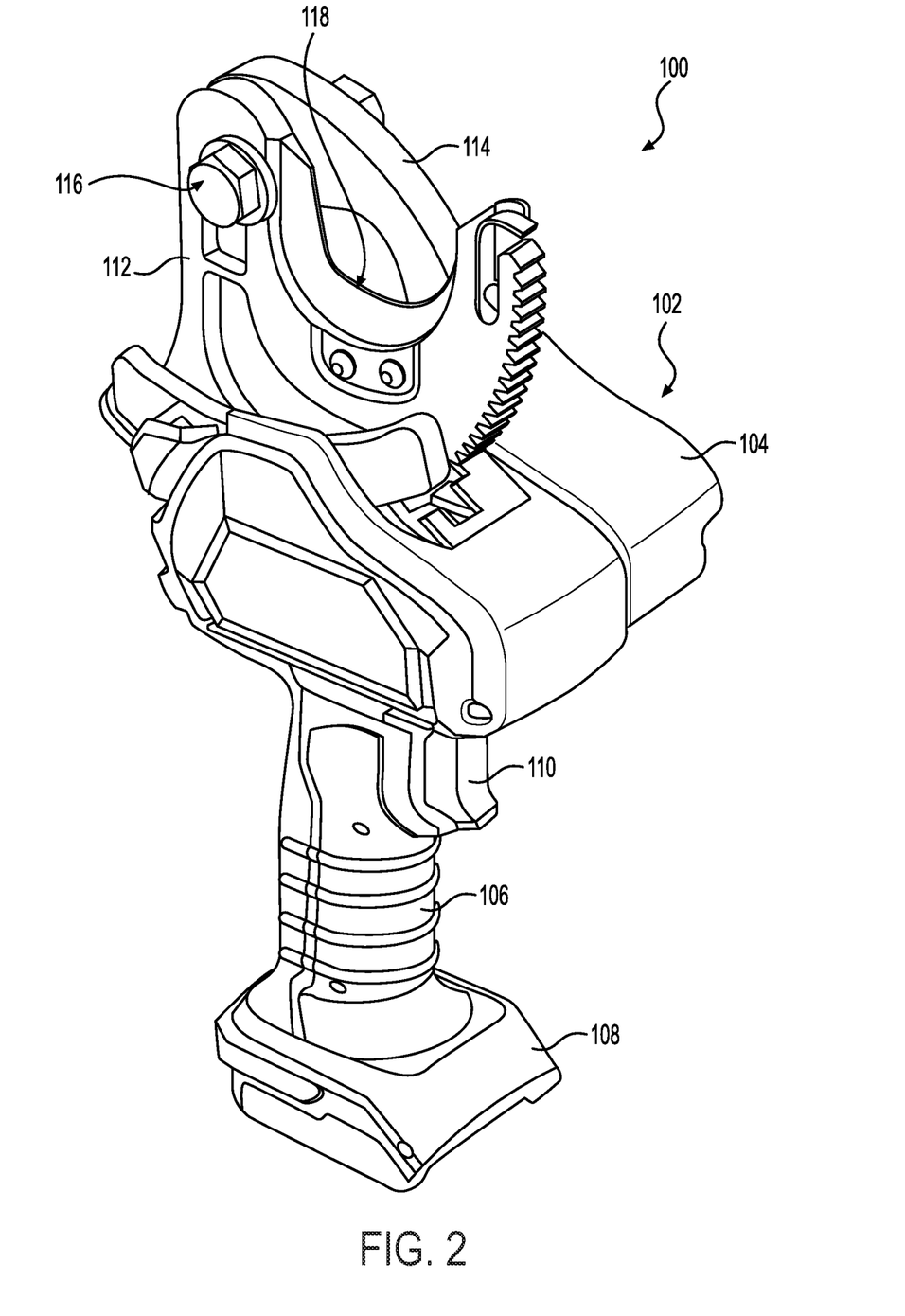

The outline from two different perspectives of a cable cutter 100 is shown in FIGS. 1 and 2. In reference to these figures, the cable cutter 100 includes a body 102 having a driver portion 104, a handle portion 106 and a battery interface portion 108. During operation, a removable and rechargeable battery (now shown) connected to the battery interface portion 108 provides electrical power that is controlled by a trigger 110 to cause motion of a moveable clamp 112 relative to a stationary clamp 114.

The moveable clamp 112 is pivotally connected to the stationary clamp 114 at a pivot joint 116 such that they create a cutter opening 122 there between, into which a cable or other article to be cut may be placed when the clamps are apart or in an open position, as shown in FIG. 1. The moveable clamp 112 includes a cutting edge 118, and the stationary clamp 114 has a cutting edge 120, which cutting edges 118 and 120 are disposed on either side of the cutter opening 122. When the trigger 110 is activated, a mechanism moves the moveable clamp 112 towards the stationary clamp 114 such that the cutting edges 118 and 120 come close and begin to overlap so that an article placed in the cutter opening 122 is severed by a scissor action between the overlapping cutting edges 118 and 120. When a cut is complete and the cable cutter 100 is in the closed position as shown in FIG. 2, the cutting edges 118 and 120 have completely overlapped and have passed past each other such that no opening of the cutter opening 122 is left, and the article to be cut has been completely severed. To reset the cutter 100, a user may back-drive the moveable clamp 112, or continue driving the clamp until teeth 136 of an arcuately shaped rack portion 124 have released from a drive mechanism that includes a pinion or drive gear, as shown in FIG. 3.

Figure 3:
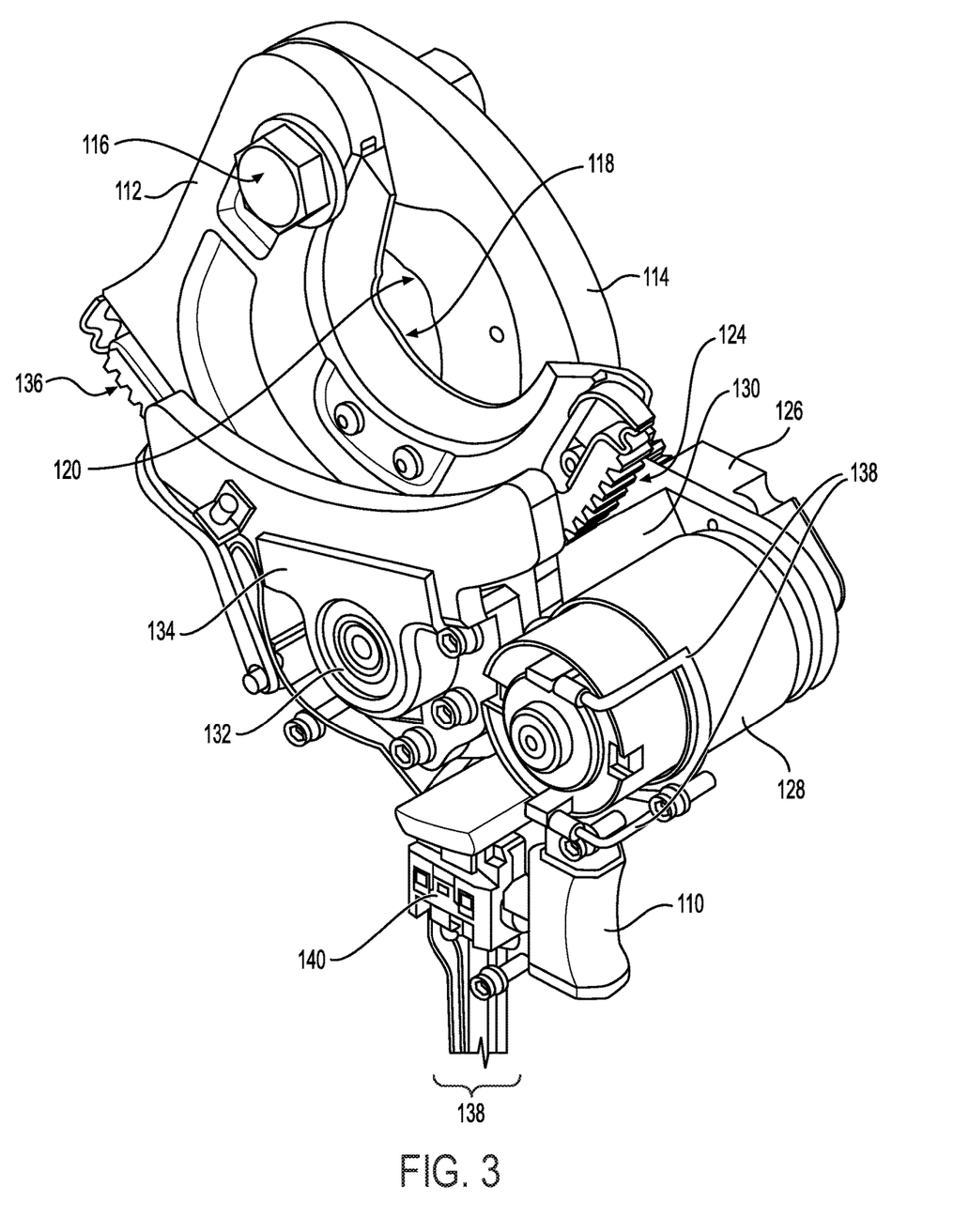
FIG. 3 is an outline view of a cutting mechanism removed from its surrounding structures for illustration of certain internal parts thereof.

FIG. 3 is an outline view of a drive and cutting mechanism of cable cutter 100, which is at least partially housed within the body 102 previously described. The mechanism includes the movable and stationary clamps 112 and 114, which are connected for pivotal motion at the pivot joint 116. The stationary clamp 114 is connected to a gearbox or transmission 130. The transmission mount 126 is connected between a motor 128 and the transmission 130. The motor 128 provides a rotational motion when powered, which is communicated to the transmission 130. In the transmission 130, the rotational motion of the motor is transformed through gear reductions, for example, a planetary gear arrangement, to reduce angular speed and increase torque. At an output of the transmission 130 is a pinion gear 132 disposed beneath a cover 134, which meshes with teeth 136 of the arcuately shaped pinion portion 124 to drive or move the moveable clamp 112. Electrical conductors 138 provide electrical power to the motor 128 from a battery, which is selectively interrupted by a switch 140 operated by the user via the trigger 110.

During operation, stresses and forces required to cut a material paced in the cutter opening 122 are present at a mounting location of the stationary clamp 114 to the transmission mount 126, at the pivot joint 116, and also internally in the structure of the clamps 112 and 114. It has been found that these stresses and forces also include bending moments, which are borne between the clamps at the pivot joint 116, and also at the mounting location of the stationary clamp 114 to the transmission mount 126, which in the illustrated embodiment is accomplished by a bore 142 or collar that is elongated to withstand bending moments.

Figure 4:
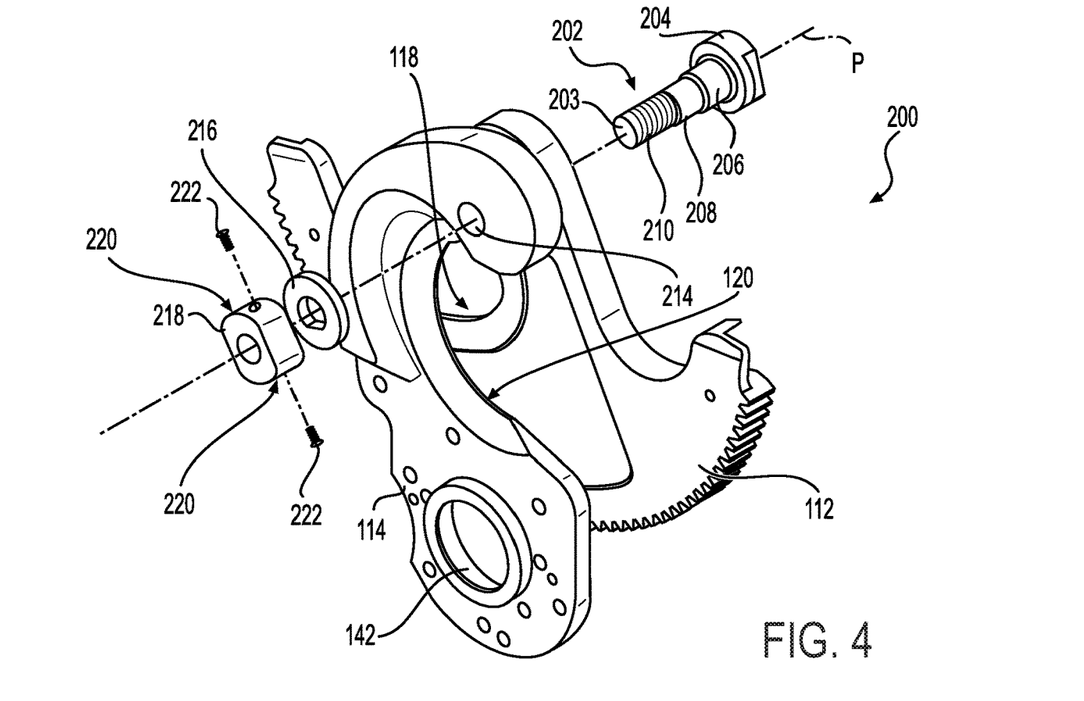
FIGS. 4-6 are alternative embodiments for a cable cutting assembly in accordance with the disclosure.
Figure 5:
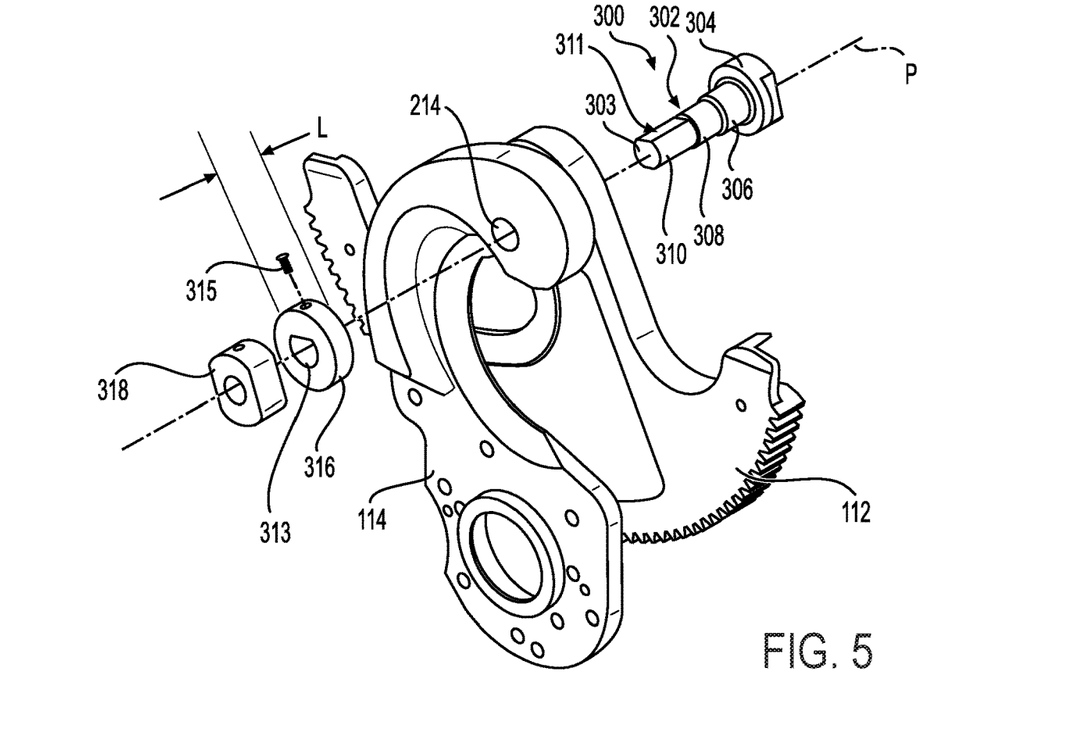
Figure 6:
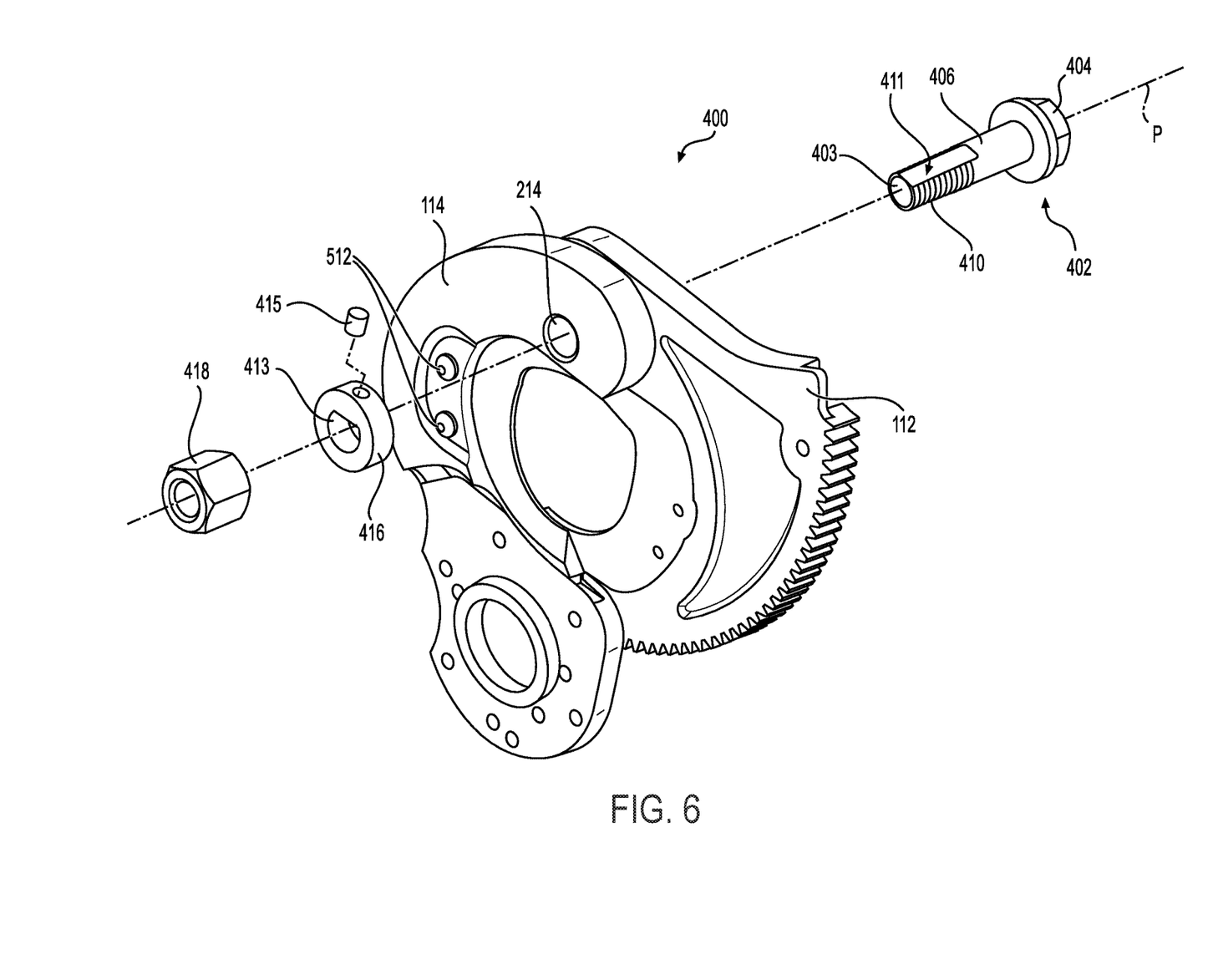

Regarding the pivot joint 116, three different embodiments are shown in FIGS. 4, 5 and 6. In these figures, structures and features that are the same or similar to corresponding structures and features previously described are denoted by the same reference numerals previously used for simplicity, but it should be appreciated that structural and/or functional differences may exist between the different embodiments, as described and highlighted below.

With reference to the embodiment of FIG. 4, a first embodiment of the pivot joint 200 is shown. The pivot joint 200 pivotally connects the moveable clamp 112 to the stationary clamp 114 such that the moveable clamp 112 can pivot about a pivot axis, P. The pivot joint 200 includes a bolt-axle 202 having a head 204 and a stepped shank 203, which includes threaded and non-threaded portions at different external diameters. Specifically, a first bearing portion 206 has a first diameter, which is larger than remaining portions of the shank 203. The first bearing portion 206 has a cylindrical shape and is unthreaded externally. The first bearing portion 206 is disposed adjacent an inner side of the head 204.

A second bearing portion 208 is disposed adjacent the first bearing portion 206 such that the first bearing portion 206 is disposed between the second bearing portion 208 and the head 204 along the pivot axis P. The second bearing portion 208 has a second diameter, which is smaller than the first diameter of the first bearing portion 206. Similar to the first bearing portion 206, the second bearing portion 208 has a cylindrical shape and is unthreaded externally.

A third bearing portion 210 is disposed adjacent the second bearing portion 208 opposite the first bearing portion 206 such that the third bearing portion 210 forms a distal end of the shank 203 opposite the head 204. The third bearing portion 210 has a third diameter, which is smaller than the second diameter of the second bearing portion 208. Unlike the first and second bearing portions 206 and 208, the third bearing portion 210 is threaded and may have a non-circular cross-section, which in the illustrated embodiment is shown as a D-cross section, meaning, a generally circular section from which a chordal segment has been removed to leave a "D" shaped cross section.

Figure 10:
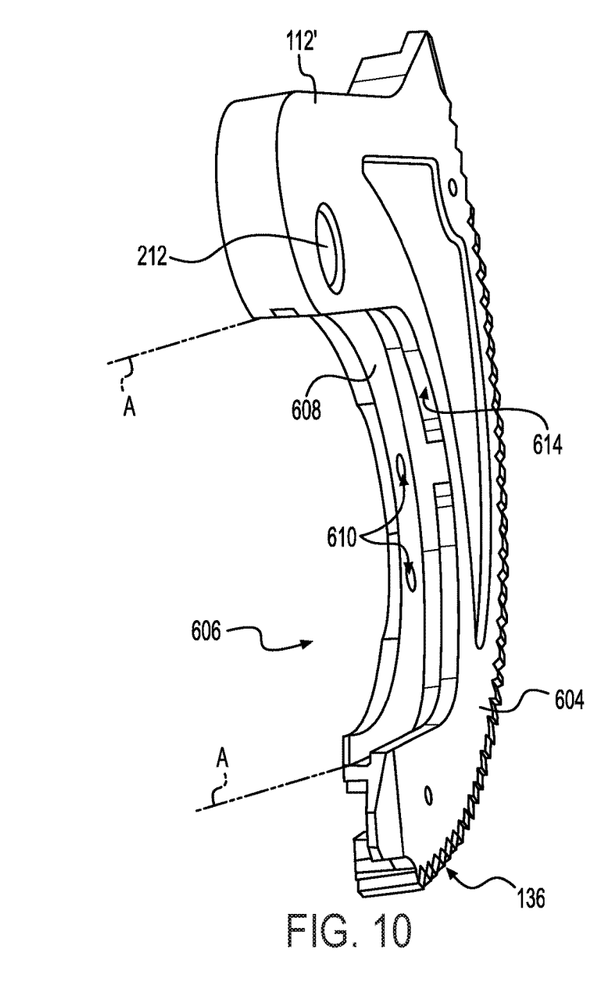

When the pivot joint 200 is assembled, the first bearing portion 206 is disposed in a pivot opening 212 (see FIG. 10) of the moveable clamp 112. The larger diameter of the first bearing portion 206 is configured to have a close, but sliding fit with an inner diameter of the pivot opening 212 such that any bending moments applied along this interface are countered without excessive angular displacement between a plane defined by the cutting edge 118 of the moveable clamp 112 and the pivot axis P. Further, the second bearing portion 208 is disposed in a pivot opening 214 (also see FIG. 8) of the stationary clamp 114. The smaller diameter of the second bearing portion 208 is configured to have a close but sliding fit with an inner diameter of the pivot opening 214 without considerable bending allowed.

It is noted that the axial length along the pivot axis P for each of the first and second bearing portions 206 and 208 is selected such that an axial location along the pivot axis P and planar orientation between planes defined by the cutting edges 118 and 120 is controlled such that the cutting edges 118 and 120 always remain on parallel planes and are immediately adjacent to one another along the pivot axis P to ensure a successful cut.

When the pivot joint 200 is assembled, a washer 216 is disposed over the third bearing portion 210 and adjacent an outer face of the stationary clamp 114. In the event that the third bearing portion 210 has a D-cross section, the washer 216 may be selected to have a mating or corresponding D-shaped opening. A nut 218 having two cross-threaded openings 220 into which setscrews are installed is threaded onto the third bearing portion 210 from the free end, and secured in place by the set screws 222 to avoid loosening of the nut 218 along the pivot axis P in a direction away from the head 204.

When a cutting operation is carried out, and the cutting system is under stress and bending moments, any rotational or sliding motion within the pivot joint 200 may be limited to the inner surface of the opening 212 in the moveable clamp 112 and the outer surface of the first bearing portion 206. In the event friction between these surfaces tends to rotate the bolt 202 along with the moveable clamp 112, then sliding provided by the washer 216 between the nut 218 and the outer surface of the stationary clamp 114 prevents bending moments tending to loosen the nut 218 from stressing the set screws 222.

With reference to the embodiment of FIG. 5, a second embodiment of the pivot joint 300 is shown. Similar to the embodiment shown in FIG. 4, the pivot joint 300 shown in FIG. 5 pivotally connects the moveable clamp 112 to the stationary clamp 114 such that the moveable clamp 112 can pivot about the pivot axis P. The pivot joint 300 includes a bolt-axle 302 having a head 304 and a stepped shank 303, which includes threaded and non-threaded portions at different external diameters. Specifically, a first bearing portion 306 has a first diameter, which is larger than remaining portions of the shank 303. The first bearing portion 306 has a cylindrical shape and is unthreaded externally. The first bearing portion 306 is disposed adjacent an inner side of the head 304.

A second bearing portion 308 is disposed adjacent the first bearing portion 306 such that the first bearing portion 306 is disposed between the second bearing portion 308 and the head 304 along the pivot axis P. The second bearing portion 308 has a second diameter, which is smaller than the first diameter of the first bearing portion 306. Similar to the first bearing portion 306, the second bearing portion 308 has a cylindrical shape and is unthreaded externally.

A third bearing portion 310 is disposed adjacent the second bearing portion 308 opposite the first bearing portion 306 such that the third bearing portion 310 forms a distal end of the shank 303 opposite the head 304. The third bearing portion 310 has a third diameter, which is smaller than the second diameter of the second bearing portion 308. Unlike the first and second bearing portions 306 and 308, the third bearing portion 310 is threaded and has a non-circular cross-section, which in the illustrated embodiment is shown as a D-cross section, meaning, a generally circular section from which a chordal segment has been removed to leave a "D" shaped cross section. As shown in FIG. 5, the third bearing portion 310 includes a pronounced flat surface 311 that extends parallel to the pivot axis P at an offset distance therefrom that intersects with the otherwise generally circular periphery of the threads of the third bearing portion 310.

When the pivot joint 300 is assembled, the first bearing portion 306 is disposed in the pivot opening 212 (see FIG. 10) of the moveable clamp 112. The larger diameter of the first bearing portion 306 is configured to have a close, but sliding fit with the inner diameter of the pivot opening 212 such that any bending moments applied along this interface are countered without excessive angular displacement between a plane defined by the cutting edge 118 of the moveable clamp 112 and the pivot axis P. Further, the second bearing portion 308 is disposed in the pivot opening 214 (also see FIG. 8) of the stationary clamp 114. The smaller diameter of the second bearing portion 308 is configured to have a close but sliding fit with an inner diameter of the pivot opening 214 without considerable bending allowed.

It is noted that the axial length along the pivot axis P for each of the first and second bearing portions 306 and 308 is selected such that an axial location along the pivot axis P and planar orientation between planes defined by the cutting edges 118 and 120 is controlled such that the cutting edges 118 and 120 always remain on parallel planes and are immediately adjacent to one another along the pivot axis P to ensure a successful cut.

When the pivot joint 300 is assembled, a collar 316 is disposed over the third bearing portion 310 (instead of the washer 216 in the embodiment shown in FIG. 4), and adjacent an outer face of the stationary clamp 114. The collar 316 has a length, L, along the pivot axis P and an opening that mates with the D-shaped cross section of the third bearing portion 310 such that a rectangular engagement surface area is created between a flat inner surface 313 of the opening in the collar 316 and the flat surface 311. A setscrew 315 engages a cross-opening formed in the collar at a radial location that coincides with the flat inner surface 313 to secure the collar 316 onto the third bearing portion 310. A nut 318 is threaded onto the third bearing portion 310 from the free end.

When a cutting operation is carried out, and the cutting system is under stress and bending moments, any rotational or sliding motion within the pivot joint 300 is limited to the inner surface of the opening 212 in the moveable clamp 112 and the outer surface of the first bearing portion 306. The increased length of the collar 316, and the setscrew 315, as compared to the washer 216 (FIG. 4), are advantageously configured to improve bending moment resistance that might tend to loosen the nut 318, and isolate the nut 318 from any torque that may act to loosen the nut 318 relative to the shank 303. Moreover, set screws 222 (FIG. 4) can be installed into threaded openings of the nut 318 to further strengthen the engagement between the nut 318 and the third bearing portion 310.

Turning now to the embodiment of FIG. 6, which is a preferred embodiment, a third pivot joint 400 is shown. Similar to the embodiments shown in FIGS. 4 and 5, the pivot joint 400 shown in FIG. 6 pivotally connects the moveable clamp 112 to the stationary clamp 114 such that the moveable clamp 112 can pivot about the pivot axis P. The pivot joint 400 includes a bolt-axle 402 having a head 404 and a shank 403, which includes a threaded and a non-threaded portion. Unlike the bolts 202 and 302, the shank 403 of the bolt-axle 402 has a uniform diameter along its length. The shank 403 includes a bearing portion 406 adjacent to an inner side of the head 404, and a threaded portion 410 that forms a distal end of the shank 403 opposite the head 404. The threaded portion 410 includes a pronounced flat surface 411 that extends parallel to the pivot axis P at an offset distance therefrom and that intersects with the otherwise generally circular periphery of the threads of the threaded portion 410.

When the pivot joint 400 is assembled, the bearing portion 406 is disposed in both the pivot opening 212 (see FIG. 10) of the moveable clamp 112 and also the pivot opening 214 (also see FIG. 8) of the stationary clamp 114. The openings 212 and 214 in this embodiment have the same inner diameter, which are configured to have a close but sliding fit with the outer diameter of the bearing portion 406.

A collar 416 is disposed over the threaded portion 410 and adjacent an outer face of the stationary clamp 114. The collar 416 abuts an inner end of the flat surface 411 and mates with the D-shaped cross section of the threaded portion 410 such that a rectangular engagement surface area is created between a flat inner surface 413 of the opening in the collar 416 and the flat surface 411. A setscrew 415 engages a cross-opening formed in the collar at a radial location that coincides with the flat inner surface 413 to secure the collar 416 onto the threaded portion 410. A nut 418, which may be a nut having standard threads, locking threads, or include a locking collar, is threaded onto the threaded portion 410 from the free end. The increased length of the collar 416, and the setscrew 415, as compared to the collar 316 (FIG. 5), are advantageously configured to further improve bending moment resistance that might tend to loosen the nut 418, as compared to the pivot joint 300, and to isolate the nut 418 from any torque that may act to loosen the nut 418, by isolating the nut 418 from any torque or bending that may be applied to the shank 403 during operation.

When a cutting operation is carried out, and the cutting system is under stress and bending moments, any rotational or sliding motion within the pivot joint 400 is limited to the inner surface of the openings 212 and 214, and the outer surface of the bearing portion 406. The increased length of the collar 416, and the setscrew 415 is advantageously configured to improve bending moment resistance that might tend to loosen the nut 418, and isolates the nut 418 from any torque that may act to loosen the nut 418 relative to the shank 403.

In the embodiment for a cutter shown in FIGS. 4 and 5, the moveable and stationary clamps 112 and 114 include integrated blades. In other words, the body of each blade forms the respective cutting edge 118 or 120. In the embodiment of FIG. 6, and also in FIGS. 7-10, an alternative embodiment is shown in which removable blades are connectable to corresponding clamps. More specifically, and in reference to FIGS. 7-10, a pair of removable blades and the corresponding clamps in which they are mountable are shown.

Figure 7:
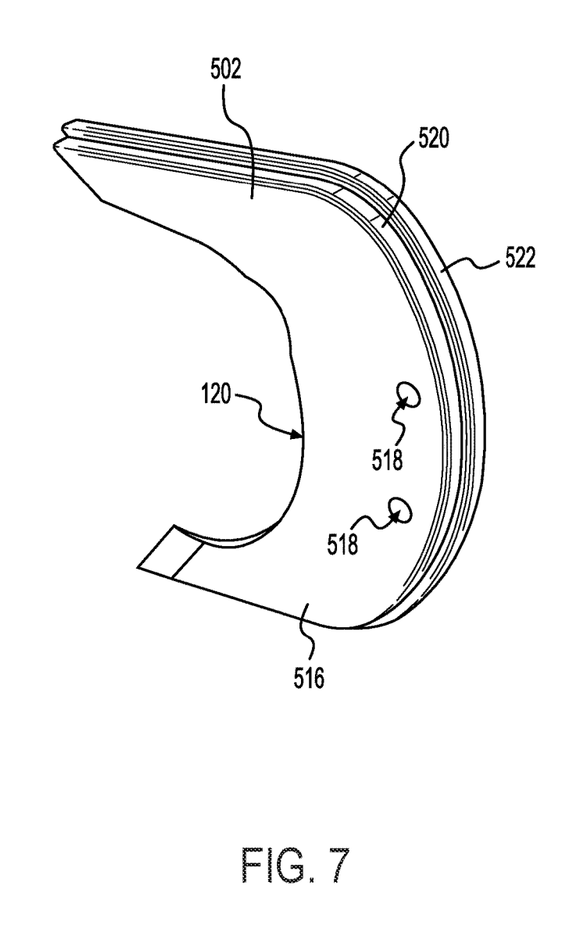
FIGS. 7 and 9 are outline views of a pair of cutting blades in accordance with the disclosure.
Figure 8:
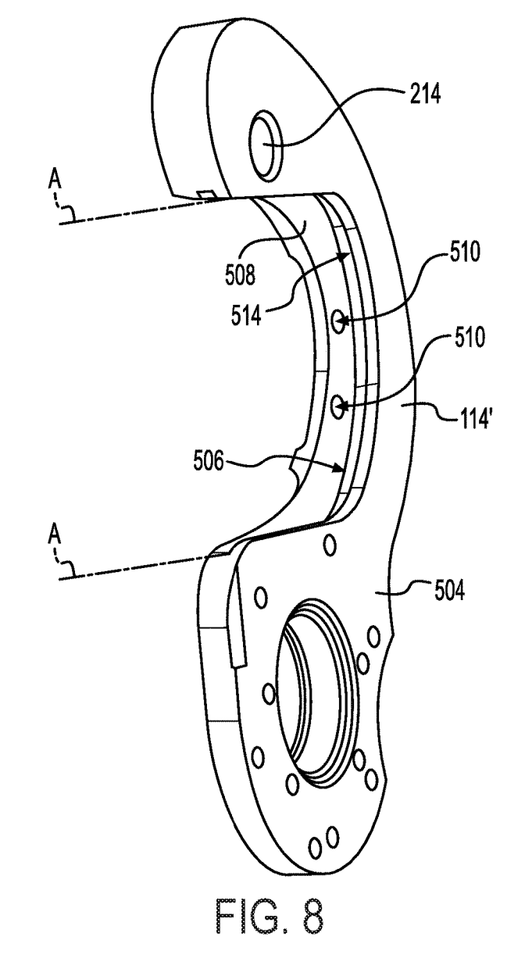
FIGS. 8 and 10 are outline views of a pair of cutting clamps in accordance with the disclosure.

A stationary clamp 114' is shown in FIG. 8, and the corresponding blade 502 is shown in FIG. 7. The clamp 114' includes a body 504 that includes a recess 506 formed in an area surrounding a location of the cutting edge. The recess 506 is generally C-shaped and includes a mounting pad 508 that is generally flat and includes two openings 510 that accommodate fasteners 512 (shown in FIG. 6). Along an outer periphery of the recess 506, the body 504 forms an arched channel 514 that has a rectangular or U-shaped side profile. The blade 502 includes a crescent-shaped body 516 that forms the cutting edge 120 on a concave side of its side profile. The body 516 forms two threaded openings 518 that engage the fasteners 512 when the blade is assembled on the clamp 114'. An outer wall 520 peripherally surrounds an outer periphery of the blade 502 along a convex side of its side profile, and a curved tab 522 is disposed along the wall 520 and follows its profile. When the blade 502 is assembled into the recess 506 of the blade 114', the tab 522 enters into and engages the channel 514 to restrain the blade 502 from moving or rotating in any direction except outward along an installation axis, A, which generally coincides with a cutting direction of the cutting edge 120. Motion along the axis A is prevented when the fasteners 512 are installed.

Figure 9:
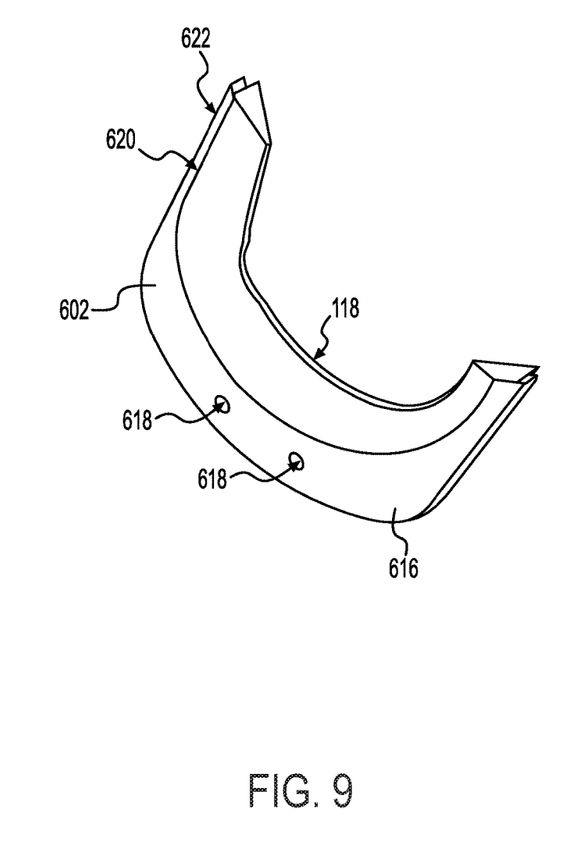

A similar arrangement is shown for the moveable clamp 112' in FIG. 8. The corresponding blade 602 is shown in FIG. 9. The moveable clamp 112' includes a body 604 that includes a recess 606 formed in an area surrounding a location of the cutting edge. The recess 606 is generally C-shaped and includes a mounting pad 608 that is generally flat and includes two openings 610 that accommodate fasteners (similar to the fasteners 512 shown in FIG. 6). Along an outer periphery of the recess 606, the body 604 forms an arched channel 614 that has a rectangular or U-shaped side profile. The blade 602 includes a crescent-shaped body 616 that forms the cutting edge 118 on a concave side of its side profile. The body 616 also forms two threaded openings 618 that engage fasteners when the blade is assembled on the clamp 112'. An outer wall 620 peripherally surrounds an outer periphery of the blade 602 along a convex side of its side profile, and a curved tab 622 is disposed along the wall 620 and follows its profile. When the blade 602 is assembled into the recess 606 of the blade 112', the tab 622 enters into and engages the channel 614 to restrain the blade 602 from moving or rotating in any direction except outward along its corresponding installation axis, A, which generally coincides with a cutting direction of the cutting edge 118. Motion along the axis A is prevented when the fasteners are installed through the openings 610 and engage the threaded openings 618, which are aligned with the openings 610 when the blade 602 is fully seated into the recess 606.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A cable cutter comprising:
    a stationary clamp, the stationary clamp comprising a pivot opening and a cutting edge spaced from the pivot opening;
    a movable clamp, the movable clamp comprising another pivot opening and another cutting edge spaced from the another pivot opening;
    a pivot joint connecting the clamps to allow the movable clamp to pivot about a pivot axis relative to the stationary clamp, the pivot joint comprising:
        a threaded connector having a head and a shank extending from the head along the pivot axis through the pivot openings in the clamps;
        a collar having opposing faces and an opening extending through the collar from one of the opposing faces to the other opposing face; and
        a nut in threaded engagement with a threaded portion of the shank;
    wherein the clamps are sandwiched between the head and the collar with the head adjacent one of the clamps, one of the opposing faces of the collar adjacent the other of the clamps, the other of the opposing faces adjacent the nut, the shank extending through the opening in the collar, and the collar engaged with the shank to rotate with the shank about the pivot axis; and
    wherein an anti-rotation portion of the shank is located in the opening of the collar, the anti-rotation portion of the shank having a non-circular cross-sectional shape and the opening in the collar having a non-circular cross-sectional shape that conforms to the non-circular cross-sectional shape of the portion of the shank.

2. The cable cutter of claim 1, wherein the head is abutted against the one of the clamps, the one of the opposing faces of the collar is abutted against the other of the clamps, and the other of the opposing faces is abutted against the nut.

3. The cable cutter of claim 1, wherein at least one of the nut and the collar comprise a threaded opening that receives a threaded fastener that is engaged against the shank.

4. The cable cutter of claim 1 wherein the non-circular cross-sectional shapes are D-shaped and are defined by mating flat surfaces formed on the shank and the collar.

5. The cable cutter of claim 1 wherein the threaded portion of the shank comprises the anti-rotation portion.

6. The cable cutter of claim 1, wherein a bearing portion of the shank is located in the pivot openings of the clamps, the bearing portion having a cylindrical outer surface.

7. The cable cutter of claim 6 wherein the shank has a uniform diameter along its length.

8. The cable cutter of claim 1, wherein a first bearing portion of the shank is located in the pivot opening of the movable clamp and a second bearing portion of the shank is located in the pivot opening of the stationary clamp, the first bearing portion has a first cylindrical outer surface having a first diameter, and the second bearing portion has a second cylindrical outer surface having a second diameter that is different than the first diameter.

9. The cable cutter of claim 8, wherein the first diameter is greater than the second diameter.

10. The cable cutter of claim 1, wherein the movable clamp comprises an arcuately shaped rack having a plurality of teeth.

11. The cable cutter of claim 10 further comprising a motor operably connected to the rack by a gear transmission.

12. A cable cutter comprising:
- a stationary clamp, the stationary clamp comprising a pivot opening and a cutting edge spaced from the pivot opening;
- a movable clamp, the movable clamp comprising another pivot opening and another cutting edge spaced from the another pivot opening;
- a pivot joint connecting the clamps to allow the movable clamp to pivot about a pivot axis relative to the stationary clamp, the pivot joint comprising:
  - a threaded connector having a head and a shank extending from the head along a pivot axis through the pivot openings in the clamps, a portion of the shank having a D-shaped cross-section;
  - a collar having opposing faces and a D-shaped opening that conforms to the D-shaped cross-section of the shank, the D-shaped opening extending through the collar from one of the opposing faces to the other opposing face; and
  - a nut in threaded engagement with a threaded portion of the shank;
- wherein the clamps are sandwiched between the head and the collar with the head adjacent one of the clamps, one of the opposing faces of the collar adjacent the other of the clamps, the other of the opposing faces adjacent the nut, the shank extending through the opening in the collar, and the portion of the shank having the D-shaped cross-section engaged with the D-shaped opening in the collar.

13. The cable cutter of claim 12 wherein the head is abutted against the one of the clamps, the one of the opposing faces of the collar is abutted against the other of the clamps, and the other of the opposing faces is abutted against the nut.

14. The cable cutter of claim 12 wherein at least one of the nut and the collar comprise a threaded opening that receives a threaded fastener that is engaged against the shank.

15. The cable cutter of claim 12 wherein the threaded portion of the shank comprises the portion of the shank having the D-shaped cross-section.

16. The cable cutter of claim 12 wherein a bearing portion of the shank is located in the pivot openings of the clamps, the bearing portion having a cylindrical outer surface.

17. The cable cutter of claim 12 wherein a first bearing portion of the shank is located in the pivot opening of the movable clamp and a second bearing portion of the shank is located in the pivot opening of the stationary clamp, the first bearing portion has a first cylindrical outer surface having a first diameter, and the second bearing portion has a second cylindrical outer surface having a second diameter that is different than the first diameter.

18. The cable cutter of claim 12 wherein the movable clamp comprises an arcuately shaped rack having a plurality of teeth.

19. The cable cutter of claim 18 further comprising a motor operably connected to the rack by a gear transmission.

* * * * *